United States Patent [19]

Nogami

[11] 4,163,588

[45] Aug. 7, 1979

[54] FLUID PRESSURE CONTROL DEVICE FOR VEHICLE BRAKING SYSTEMS

[75] Inventor: Tomoyuki Nogami, Toyota, Japan

[73] Assignee: Toyota Jidosha Kogyo Kabushiki Kaisha, Toyota, Japan

[21] Appl. No.: 878,596

[22] Filed: Feb. 16, 1978

[30] Foreign Application Priority Data

Feb. 21, 1977 [JP] Japan ............................ 52-20694[U]

[51] Int. Cl.² .......................... B60T 8/14; B60T 8/22
[52] U.S. Cl. .................................... 303/24 C; 303/6 C
[58] Field of Search ................. 303/6 C, 22 R, 24 A, 303/24 C, 24 F

[56] References Cited

U.S. PATENT DOCUMENTS 3,994,533  11/1976  Ohta .............................. 303/24 C X

FOREIGN PATENT DOCUMENTS 1079507  8/1967  United Kingdom .

Primary Examiner—Duane A. Reger
Attorney, Agent, or Firm—Kenyon & Kenyon

[57] ABSTRACT

In a vehicle braking system, a fluid pressure control device comprises an inertia-controlled valve for interrupting fluid communication between a master cylinder and rear wheel brake cylinders at a deceleration in excess of a predetermined value and a differential piston for gradually increasing the fluid pressure trapped within the wheel brake cylinders after the valve is closed. The control device is provided therein with a spring which is detachably engaged at opposite ends thereof with the small and large diameter portions of the piston in such a manner that the piston is urged toward an outlet chamber by engagement with the spring when moved toward an inlet chamber and also urged toward the inlet chamber by engagement with the spring when moved toward the outlet chamber.

3 Claims, 2 Drawing Figures

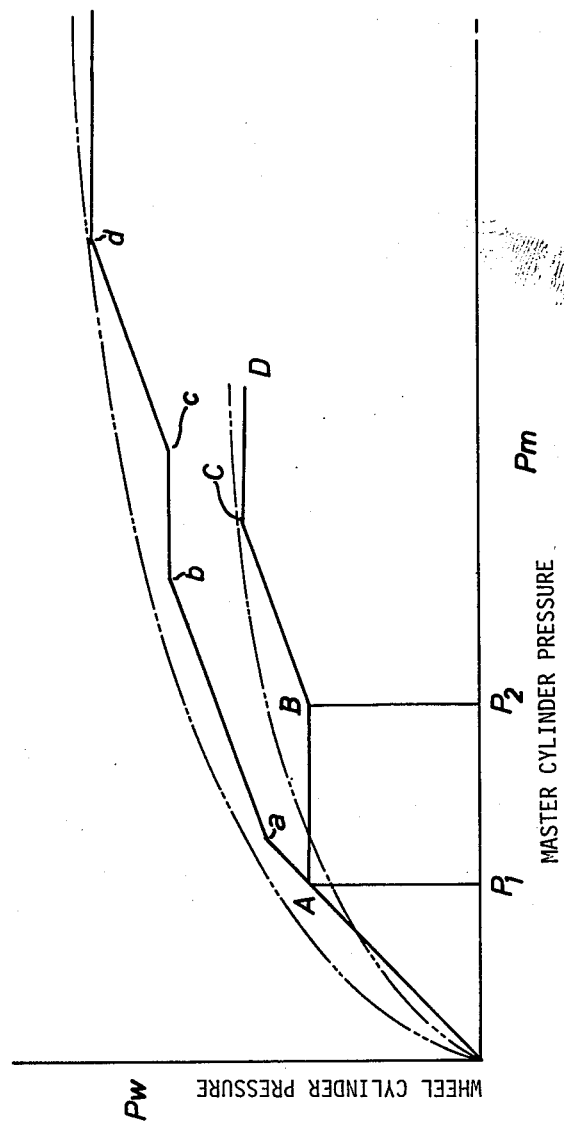

FLUID PRESSURE CONTROL DEVICE FOR VEHICLE BRAKING SYSTEMS

BACKGROUND OF THE INVENTION

The present invention relates to fluid pressure control devices for vehicle braking systems, and more particularly to an improved fluid pressure control device of the type which comprises an inertia-controlled valve for interrupting fluid communication between a master cylinder and rear wheel brake cylinders at a deceleration in excess of a predetermined value and a differential piston for gradually increasing the fluid pressure trapped within the wheel brake cylinders after the valve is closed.

SUMMARY OF THE INVENTION

The primary object of the present invention is to provide an improved fluid pressure control device wherein movements of the differential piston are controlled by resilient force acting on the piston in accordance with loaded conditions of the vehicle to make the braking force distribution ratio between the front and rear wheel brakes as close as possible to the ideal distribution ratio.

According to the present invention, there is provided a fluid pressure control device for incorporation in a vehicle braking system between a master cylinder and rear wheel brake cylinders, which comprises:

a housing adapted to be fixedly mounted at an inclined angle on a vehicle body frame, the housing being provided thereon with an inlet port for connection to the master cylinder and an outlet port for connection to the wheel brake cylinders and being provided therein with a stepped bore having a small diameter portion and a large diameter portion spaced therefrom, said stepped bore being in communication with the inlet and outlet ports respectively at the small and large diameter portions thereof, and a first chamber in communication with the small and large diameter portions of the stepped bore at opposite sides thereof;

a differential piston having small and large diameter portions slidably disposed within the respective small and large diameter portions of the stepped bore to provide second and third chambers respectively in open communication with the inlet and outlet ports, the piston being exposed at its small diameter portion in the second chamber and at its large diameter portion in the third chamber;

a spring housed within said space between the small and large diameter portions of the stepped bore and detachably engaged at opposite ends thereof with the small and large diameter portions of the piston;

cut-off valve means including a valve seat provided on a side wall of the first chamber to permit fluid flow between the second and third chambers and an inertia-controlled ball housed within the first chamber to co-operate with the valve seat and rolling toward the valve seat on the inclined bottom surface of the first chamber to cut off fluid flow from the second chamber to the third chamber when the ball is subjected to a deceleration in excess of a predetermined value.

The fluid pressure control device is characterized in that the differential piston is loaded toward the outlet port by engagement with the spring when moved toward the inlet port due to fluid pressure in the third chamber and is also loaded toward the inlet port by engagement with the spring when moved toward the outlet port due to fluid pressure in the second chamber.

BRIEF DESCRIPTION OF THE DRAWINGS

Additional objects and advantages of the present invention will be more readily apparent from the following detailed description of a preferred embodiment thereof when taken together with the accompanying drawings in which:

FIG. 2 is a graph indicating the pressure controlling characteristics of the control device.

DESCRIPTION OF THE PREFERRED EMBODIMENT

Figure 1:
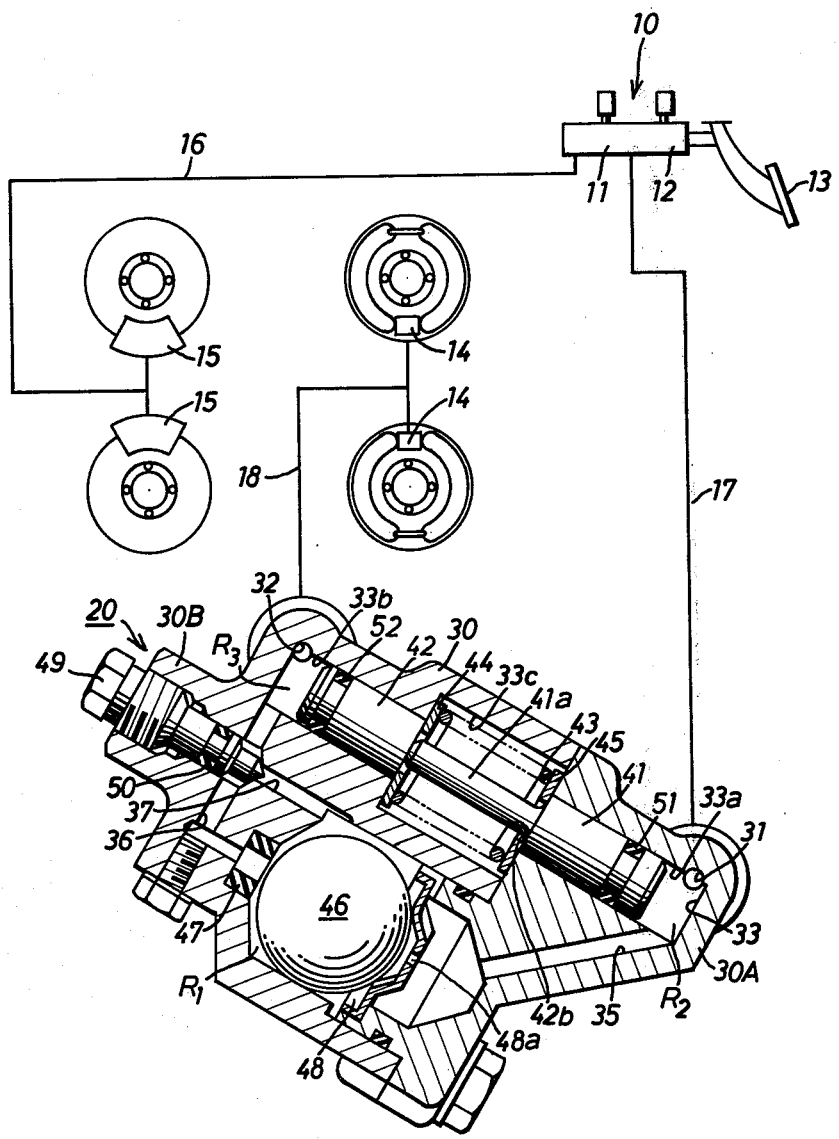
FIG. 1 illustrates a vehicle braking system including a fluid pressure control device in accordance with the present invention.

Referring now to the drawings, particularly in FIG. 1 there is illustrated a conventional tandem master cylinder 10 which is operated by depression of a foot brake pedal 13. The master cylinder 10 is provided with a front pressure chamber 11 connected to front wheel brake cylinders 15 by way of a conduit 16 and a rear pressure chamber 12 connected to rear wheel brake cylinders 14 by way of conduits 17 and 18. Interposed between the conduits 17 and 18 is a fluid pressure control device 20 in accordance with the present invention.

The control device 20 is fixedly mounted under the vehicle body floor at an inclined angle in relation to the horizontal and comprises a housed assembly 30 which is provided therein with a small diameter piston 41, a large diameter piston 42 and an inertia-controlled ball 46. The housing assembly 30 includes a rear housing 30A provided thereon with an inlet port 31 and a front housing 30B provided thereon with an outlet port 32. The inlet port 31 is connected to the rear pressure chamber 12 of the master cylinder 10 by way of the conduit 17. The outlet port 32 is connected to the rear wheel brake cylinders 14 by way of the conduit 18. Within the housing assembly 30, there are provided in parallel a stepped cylindrical bore 33 and a first fluid chamber $R_1$. The stepped cylindrical bore 33 includes a small diameter portion 33a into which the inlet port 31 opens and a large diameter portion 33b into which the outlet port 32 opens. Between the small and large diameter portions 33a and 33b, there is provided a space 33c in which a coil spring 43 is assembled. The first fluid chamber $R_1$ communicates with the small and large diameter portions 33a and 33b of the stepped bore 33 by way of a first passage 35 and a second passage 36 respectively. The second passage 36 is also connected to the upper portion of the first fluid chamber $R_1$ through a bypass passage 37, which is normally closed by the tip of a screw plug 49 threaded into the front housing 30B through an annular seal member 50. When the braking system is supplied with brake fluid, the plug 49 is temporarily released outwardly to open the bypass passage 37.

The small diameter piston 41 is reciprocably engaged within the small diameter portion 33a of the stepped bore 33 via an annular seal member 51 to form a second fluid chamber $R_2$ into which the inlet port 31 opens directly. The first fluid chamber $R_1$ is connected to the second fluid chamber $R_2$ by way of the first passage 35. The large diameter piston 42 is reciprocably engaged within the large diameter portion 33b of the stepped bore 33 via an annular seal member 52 to form a third fluid chamber $R_3$ into which the outlet port 32 opens directly. The first fluid chamber $R_1$ is connected to the third fluid chamber $R_3$ by way of the second passage 36. Due to fluid pressures applied in the second and third chambers $R_2$ and $R_3$, the small diameter piston 41 is constantly engaged at its extension 41a with the large diameter piston 42 to provide a differential piston. The coil spring 43 is interposed between a pair of inner shoulders of the housings 30A and 30B through a pair of annular retainers 44 and 45 and is compressed with a predetermined load. Thus, the compression coil spring 43 is detachably engaged at one end thereof with the large diameter piston 42 by means of the left hand retainer 44 and is also detachably engaged at the other end thereof with the small diameter piston 41 by means of the right hand retainer 45.

The inertia-controlled ball 46 housed within the first fluid chamber $R_1$ is free to roll forwardly up the inclined bottom of the first chamber $R_1$ and co-operates with an annular valve seat 47 secured to the side wall of the chamber $R_1$ to provide a cut-off valve. The ball 46 normally rests under gravity in the position shown in the drawing and is received by a support plate 48 which is secured to the inner wall of the rear housing 31A. The support plate 48 is formed with an orifice 48a. In braking operation, when the rate of deceleration caused by the application of the brakes exceeds a predetermined value, the ball 46 will roll forwardly due to the inertia force acting thereon toward the valve seat 47 so that the cut-off valve is closed to interrupt fluid communication between the first and third fluid chambers $R_1$ and $R_3$.

Under the unloaded condition of the vehicle, depression of the brake pedal 13 produces fluid pressure within the respective pressure chambers 11 and 12 of the master cylinder 10. The pressure in the front pressure chamber 11 is applied directly to the front wheel brake cylinders 15 through the conduit 16, and the pressure in the rear pressure chamber 12 is applied to the inlet port 31 of the control device 20 through the conduit 17. The master cylinder pressure $P_m$ applied to the inlet port 31 is applied to the third chamber $R_3$ via the second chamber $R_2$, the first passage 35, the first chamber $R_1$, the valve seat 47 and the second passage 36 in sequence and, then, applied to the rear wheel brake cylinders 14 through the outlet port 32 and the conduit 18 to operate the rear wheel brakes. Thus, the vehicle is braked in accordance with the value of the master cylinder pressure $P_m$ applied to the front and rear wheel brake cylinders 15 and 14.

In this braking operation, within the control device 20, the small diameter piston 41 is urged forwardly by the pressure in the second chamber $R_2$ and the large diameter piston 42 is urged rearwardly by the pressure in the third chamber $R_3$. In this instance, the rearward movement of the piston 42 is restricted by the resilient force of the compression coil spring 43. When the master cylinder pressure $P_m$ reaches a value $P_1$ to cause the rate of deceleration of the vehicle in excess of the predetermined value, the ball 46 starts to roll forwardly toward the valve seat 47 due to the inertia force acting thereon and, in turn, the cut-off valve is closed by engagement of the ball 46 with the valve seat 47 to interrupt the fluid communication between the first chamber $R_1$ and the second passage 36. At this stage, the ball 46 is held on the valve seat 47 due to the inertia and the difference in pressure between the first and third chambers $R_1$ and $R_3$, and the forward movement of the small diameter piston 41 is still restricted by the resilient force of the spring 43 so that the wheel cylinder pressure $P_w$ is controlled as shown by a segment line A–B in FIG. 2.

Thereafter, due to increase of the master cylinder pressure $P_m$ up to a value $P_2$, the fluid pressure acting on the small diameter piston 41 moves the large diameter piston 42 toward the outlet port 32 against the resilient force of the spring 43. Then, the large diameter piston 42 acts on the fluid trapped in the conduit 18 after closing of the cut-off valve and increases the wheel cylinder pressure in the conduit 18, but owing to the difference between the effective pressure receiving areas of the pistons 41 and 42 the rate of increase is less than the rate of increase in the master cylinder pressure $P_m$, as shown by a segment line B–C in FIG. 2. The control of wheel cylinder pressure $P_w$ will continue until the large diameter piston 42 abuts against the inner wall of the third chamber $R_3$. After abutment with the inner wall of the chamber $R_3$, the pistons 41 and 42 do not move forwardly and the wheel cylinder pressure $P_w$ is maintained in a predetermined high value, as shown by a segment line C–D in FIG. 2.

Under the loaded condition of the vehicle, when the brake pedal 13 is depressed to apply the master cylinder pressure from the master cylinder 10 to the front and rear wheel brake cylinders 15 and 14 in the same process as described above, the large diameter piston 42 moves rearwardly against the resilient force of the spring 43 due to the pressure in the third chamber $R_3$ and the small diameter piston 41 is separated from the right hand retainer 45. In this braking operation, when the inertia force acting on the ball 46 exceeds a predetermined value, the ball 46 rolls forwardly up the bottom surface of the first chamber $R_1$ to close the cut-off valve so that the fluid communication between the first and third chambers $R_1$ and $R_3$ is blocked, which is indicated by a character a in FIG. 2. If the master cylinder pressure $P_m$ increases by continued depression of the brake pedal, the large diameter piston 42 is moved forwardly toward the outlet port 32 due to the fluid pressure acting on the small diameter piston 41 and returning force of the spring 43. Thus, the large diameter piston 42 acts to gradually increase the wheel cylinder pressure $P_w$ in the conduit 18, as shown by a segment line a–b in FIG. 2. The increase of the wheel cylinder pressure $P_w$ will continue until the small diameter piston 41 abuts against the right hand retainer 45. After abutment with the retainer 45, the forward movement of the small diameter piston 41 is restricted by the resilient force of the spring 43 so that the wheel cylinder pressure $P_w$ is controlled in a constant value, as shown by a segment line b–c in FIG. 2. Thereafter, due to further increase of the master cylinder pressure $P_m$, the fluid pressure acting on the small diameter piston 41 further moves the large diameter piston 42 toward the outlet port 32 against the resilient force of the spring 43 to gradually increase the wheel cylinder pressure $P_w$ in the conduit 18, as shown by a segment line c–d in FIG. 2. Thus, the desired accuracy in pressure control is always well maintained by the control device 20 regardless of the variations in static load on the wheels of the vehicle.

In an actual practice of the present invention, the pressure control characteristics of the control device 20 is properly arranged by adjustments of the mounting angle of the housing assembly 30, the effective pressure receiving area of each piston, and the resilient force of the spring 43. In addition, the two pistons 41 and 42 may be integrally formed to provide a differential piston.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. In a fluid pressure control device for a vehicle braking system incorporating between a master cylinder and wheel brake cylinders, comprising:

a housing adapted to be fixedly mounted on a vehicle body frame, said housing being provided thereon with an inlet port for connection to said master cylinder and an outlet port for connection to said wheel brake cylinders and being provided therein with a stepped bore having a small diameter portion and a large diameter portion, said bore being in communication with said inlet and outlet ports respectively at the small and large diameter portions thereof, and a first chamber in communication with the small and large diameter portions of said stepped bore at opposite sides thereof;

a differential piston having small and large diameter portions slidably disposed within the respective small and large diameter portions of said stepped bore to provide second and third chambers respectively in open communcation with said inlet and outlet ports, said piston being exposed at its small diameter portion in said second chamber and at its large diameter portion in said third chamber;

a spring loading said piston axially in a direction toward said outlet port; and cut-off valve means including a valve seat provided on a wall of said first chamber to permit fluid flow between said second and third chambers and an inertia-controlled ball housed within said first chamber to co-operate with said valve seat to cut off fluid flow from said second chamber to said third chamber when said ball is subjected to a deceleration in excess of a predetermined value;

the improvement wherein said housing includes a space between the small and large diameter portions of said stepped bore, and said spring is housed within said space between the small and large diameter portions of said stepped bore and is detachably engaged at opposite ends thereof with the small and large diameter portions of said piston, whereby said piston is loaded toward said outlet port by engagement with said spring when moved toward said inlet port and loaded toward said inlet port by engagement with said spring when moved toward said outlet port.

2. A fluid pressure control device as claimed in claim 1, wherein the diameter of said space is larger than the large diameter portion of the stepped bore so as to form a pair of inner shoulders at opposite ends of said space, said spring is engaged at opposite ends thereof with said pair of inner shoulders of said housing through a pair of retainers, and said piston is detachably engaged at the small and large diameter portions thereof with each of said retainers.

3. A fluid pressure control device as claimed in claim 1, wherein said differential piston comprises a small diameter piston slidable within the small diameter portion of said stepped bore and a large diameter piston slidable within the large diameter portion of said stepped bore and in contact with said small diameter piston.

* * * * *